United States Patent
Chechendaev et al.

(10) Patent No.: US 12,460,924 B2
(45) Date of Patent: Nov. 4, 2025

(54) THREE-DIMENSIONAL SCANNER HAVING SENSORS WITH OVERLAPPING FIELDS OF VIEW

(71) Applicant: ARTEC EUROPE S.À R.L., Senningerberg (LU)

(72) Inventors: Alexey Chechendaev, Moscow (RU); Maxim Frolov, Moscow (RU); Alexander Sharapov, Trintange (LU)

(73) Assignee: ARTEC EUROPE S.À R.L., Senningerberg (LU)

( * ) Notice: Subject to any disclaimer, the term of this patent is extended or adjusted under 35 U.S.C. 154(b) by 0 days.

(21) Appl. No.: 18/252,184

(22) PCT Filed: Oct. 27, 2021

(86) PCT No.: PCT/IB2021/000722
§ 371 (c)(1),
(2) Date: May 8, 2023

(87) PCT Pub. No.: WO2022/096925
PCT Pub. Date: May 12, 2022

(65) Prior Publication Data
US 2023/0408253 A1    Dec. 21, 2023

Related U.S. Application Data

(60) Provisional application No. 63/111,445, filed on Nov. 9, 2020.

(51) Int. Cl.
*G01B 11/25*    (2006.01)
*H04N 13/243*    (2018.01)
*H04N 13/00*    (2018.01)

(52) U.S. Cl.
CPC ...... *G01B 11/2513* (2013.01); *G01B 11/2545* (2013.01); *H04N 13/243* (2018.05); *H04N 2013/0074* (2013.01)

(58) Field of Classification Search
CPC .......................... G01B 11/2513; H04N 13/243
(Continued)

(56) References Cited

U.S. PATENT DOCUMENTS 4,937,445 A    6/1990    Leong et al.
5,307,151 A *   4/1994    Hof .......................... G06T 7/521
                                                  356/604
(Continued)

OTHER PUBLICATIONS

Artec Europe S.A R.L., International Search Report and Written Opinion, PCT/IB2021/000722, Apr. 12, 2022, 13 pgs.
(Continued)

*Primary Examiner* — Amir Shahnami
(74) *Attorney, Agent, or Firm* — Thompson Coburn LLP

(57) ABSTRACT

A system includes a projector configured to project a plurality of non-coded elements onto an object, the projector having a first optical axis. The system includes a first camera having a first lens and a first sensor. The first lens defines a second optical axis. The system includes a second camera having a second lens and a second sensor. The second lens defines a third optical axis. The projector, the first camera, and the second camera are disposed on a substantially straight line in a first direction. The first optical axis is substantially parallel to the second optical axis, which is substantially parallel to the third optical axis. A center of the first sensor is displaced along the first direction away from the second optical axis, and a center of the second sensor is displaced along the first direction away from the third optical axis.

22 Claims, 9 Drawing Sheets

(58) Field of Classification Search
USPC .......................................................... 348/46
See application file for complete search history.

(56) References Cited

U.S. PATENT DOCUMENTS

| | | | |
|---|---|---|---|
| 2004/0105580 A1* | 6/2004 | Hager .................... | G06V 10/24 |
| | | | 382/154 |
| 2011/0057930 A1* | 3/2011 | Keller .................. | H04N 13/254 |
| | | | 345/419 |
| 2015/0085080 A1* | 3/2015 | Hollenbeck ........ | G01B 11/2545 |
| | | | 348/47 |
| 2017/0251197 A1 | 8/2017 | Willomitzer | |
| 2017/0307363 A1 | 10/2017 | Hollenbeck et al. | |
| 2018/0249142 A1 | 8/2018 | Hicks et al. | |
| 2019/0052851 A1* | 2/2019 | Korl .................... | H04N 9/3194 |

OTHER PUBLICATIONS

Willomitzer et al., "Single-shot 3D sensing with improved data density", Jun. 8, 2014, 10 pgs.
Chen et al., "Simple calibration method for dual-camera structured light system", Journal of the European Optical Society-Rapid Publications, 14:23, Oct. 26, 2018, 11 pgs.
Artec Europe S.A.R.L., Communication Pursuant to Article 94(3), EP21823348.4, Jan. 16, 2025, 7 pgs.
Artec Europe S.A R.L., International Preliminary Report on Patentability, PCT/IB2021/000722, May 8, 2023, 7 pgs.

* cited by examiner

THREE-DIMENSIONAL SCANNER HAVING SENSORS WITH OVERLAPPING FIELDS OF VIEW

CROSS REFERENCE TO RELATED APPLICATION

This Application is a United States National Stage Application filed under 35 U.S.C. § 371 of PCT Patent Application Serial No. PCT/IB2021/000722 filed on Oct. 27, 2021, which claims the benefit of and priority to U.S. Patent Application No. 63/111,445 filed on Nov. 9, 2020, each of which is hereby incorporated by reference in its entirety.

TECHNICAL FIELD

The present invention relates generally to three-dimensional scanners and, more particularly, to three-dimensional scanners having sensors with overlapping fields of view.

BACKGROUND

Three-dimensional (3D) scanners are devices that build a 3D model of a surface of a physical object. Three-dimensional scanners have applications across many fields, including industrial design and manufacturing, computerized animation, science, education, medicine, art, design, and others.

SUMMARY

The present disclosure relates to 3D scanning technology. One approach to 3D scanning is the use of so-called "structured light" in which a projector projects a known pattern of light on to the surface of an object. For example, light from the projector may be directed through a slide that has the pattern printed on it. The shape of the surface of the object is inferred from the distortions in the pattern of light captured by a camera. One or more cameras may be used to obtain images of the reflection of the pattern on the object. By measuring positions of elements of the pattern in the image (e.g., measuring distortions of the pattern), a computer system may determine the positions on the surface of the object using simple geometric calculations such as, for example, a triangulation algorithm. Structured light approaches may be contrasted to other approaches, such as a time-of-flight approach in which a laser range finder finds the distance to a surface by timing the round-trip time of a pulse of light that is raster scanned over the surface.

In order to determine the positions on the surface of the object, the computer system needs to know which element in the image corresponds to which element on the slide. There are two general approaches to solving this problem: one method utilizes coded elements and an alternative method relies on non-coded elements. With coded elements, the elements in the pattern have some unique identifying characteristic that allows the computer system to figure out which imaged element corresponds to which element on the object. With non-coded elements (e.g., lines), some other method is needed to disambiguate one imaged element from the others.

In some embodiments, a method is provided for disambiguating imaged elements (e.g., lines) in a non-coded structured light approach to 3D scanning. The method is performed using a scanner that has a projector and at least two cameras. The projector projects a plurality of lines onto the surface of an object. The reflections are imaged by the first camera and the second camera. An element is detected in a first image from the first camera (e.g., a distorted line) and a correspondence to an element of the projection pattern is hypothesized. Using the hypothesis, the position of the element is translated to a second image in the second camera. The hypothesis is ruled out if the element is not also present in the second image. In some embodiments, the hypothesis is ruled out if the hypothesis would result in a position on the object that is outside of the depth of focus of the first camera.

In some embodiments, a 3D scanner is provided. In some embodiments, the 3D scanner uses a structured light approach. In some embodiments, the 3D scanner uses non-coded elements. By overlapping fields of view of two or more cameras, and the projector, performance of the 3D scanner is improved. In some embodiments, in order to improve ease of manufacturing, among other benefits, the two or more cameras and the projector have optical axes that are substantially parallel. This way, the two or more cameras (including their sensors and optics) can be mounted on parallel planes. For example, the sensors for the two or more cameras may be mounted on a single printed circuit board. To maximize the overlaps of the fields of view of the two or more cameras, at least one camera's sensor is displaced (e.g., shifted) with respect to its optical axis.

To that end, the 3D scanner includes a projector configured to project a plurality of non-coded elements onto an object. The projector has a first optical axis. The 3D scanner further includes a first camera comprising a first lens and a first sensor. The first lens focusses a reflection of a first portion of the plurality of non-coded elements onto the first sensor. The first lens defines a second optical axis. The 3D scanner includes a second camera comprising a second lens and a second sensor. The second lens focusses a reflection of a second portion of the plurality of non-coded elements onto the second sensor. The second lens defines a third optical axis. The projector, the first camera, and the second camera are offset from one another in a first direction. The first optical axis is substantially parallel to the second optical axis, which is substantially parallel to the third optical axis. A center of the first sensor is displaced along the first direction away from the second optical axis. In some embodiments, a center of the second sensor is displaced along the first direction away from the third optical axis.

BRIEF DESCRIPTION OF THE DRAWINGS

For a better understanding of the various described embodiments, reference should be made to the Description of Embodiments below, in conjunction with the following drawings.

The various figures described above, generally speaking, show different embodiments of 3D scanners provided by this disclosure. It will be understood, however, that certain features of the scanner (e.g., cameras, projectors, and the like) shown in and described with respect to one figure may be analogous to those described with reference to other scanners shown in other figures. For brevity, such details are not repeated throughout this disclosure.

DESCRIPTION OF EMBODIMENTS

Reference will now be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure inventive aspects of the embodiments.

Note that, as used herein, the term offset is used to refer to the relative position of cameras and detectors within the body of the scanner (e.g., the housing), whereas the term displacement is used to describe a position of a sensor with respect to an optical axis of a camera or of a slide with respect to the optical axis of a projector.

Figure 1:
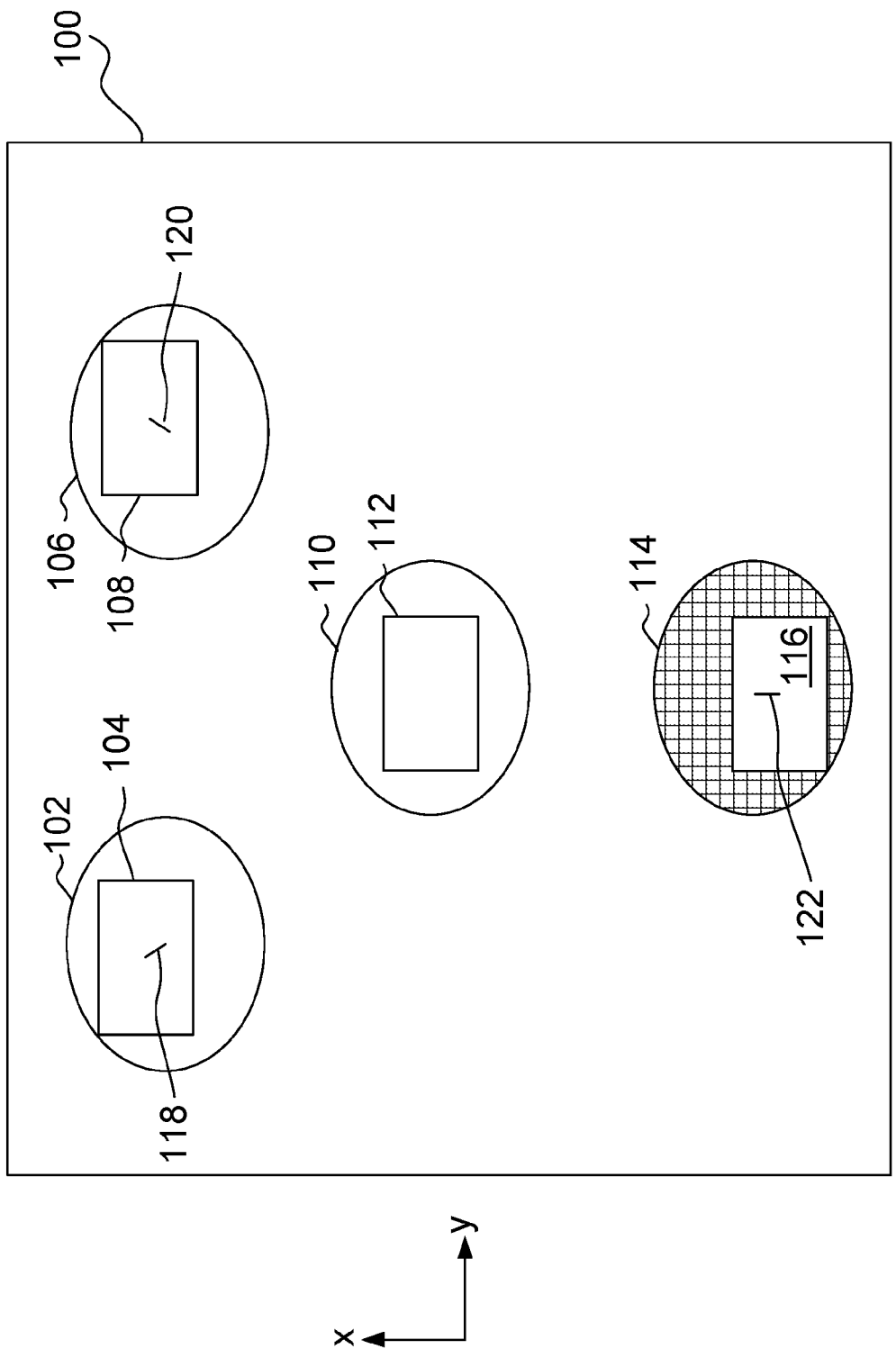
FIG. 1 is a schematic diagram of a front view of a 3D scanner, in accordance with some embodiments.

FIG. 1 shows a front view of a 3D scanner 100 that includes a projector 114 which projects one or more non-coded elements onto an object to be measured. In some embodiments, the one or more non-coded elements are part of a non-coded pattern of light (i.e., the non-coded pattern of light comprises the one or more non-coded elements). The 3D scanner 100 includes three cameras (a first camera 102, a second camera 106, and a third camera 110). In some embodiments, fewer than three cameras are used. For example, in some embodiments, two cameras are used. In other embodiments, just one camera is used. In some embodiments, more than three cameras are used (e.g., four cameras, five cameras). The first camera 102 includes a first sensor 104, the second camera 106 includes a second sensor 108, and the third camera 110 includes a third sensor 112.

In some embodiments, the three cameras are for capturing the non-coded pattern of light that is reflected from the object. In some embodiments, a non-coded pattern of light includes structured light patterns such as lines or other repetitive elements. The term non-coded pattern means that such lines or repetitive elements lack individual unique characteristics that allow a particular element of the pattern to be identified in the captured image. In some embodiments, two or more cameras are used to identify a particular element (e.g., a line) recorded in images of each of the two or more cameras. In some embodiments, the non-coded pattern has a set of simple elements (e.g., lines, dots, small bars) having a relatively small dimension in at least a first direction (e.g., the x-direction, y-direction). Individual features of these simple elements are not salient enough to identify the element by an image acquired from a single camera that is not sufficiently close to projector 114.

Figure 9:
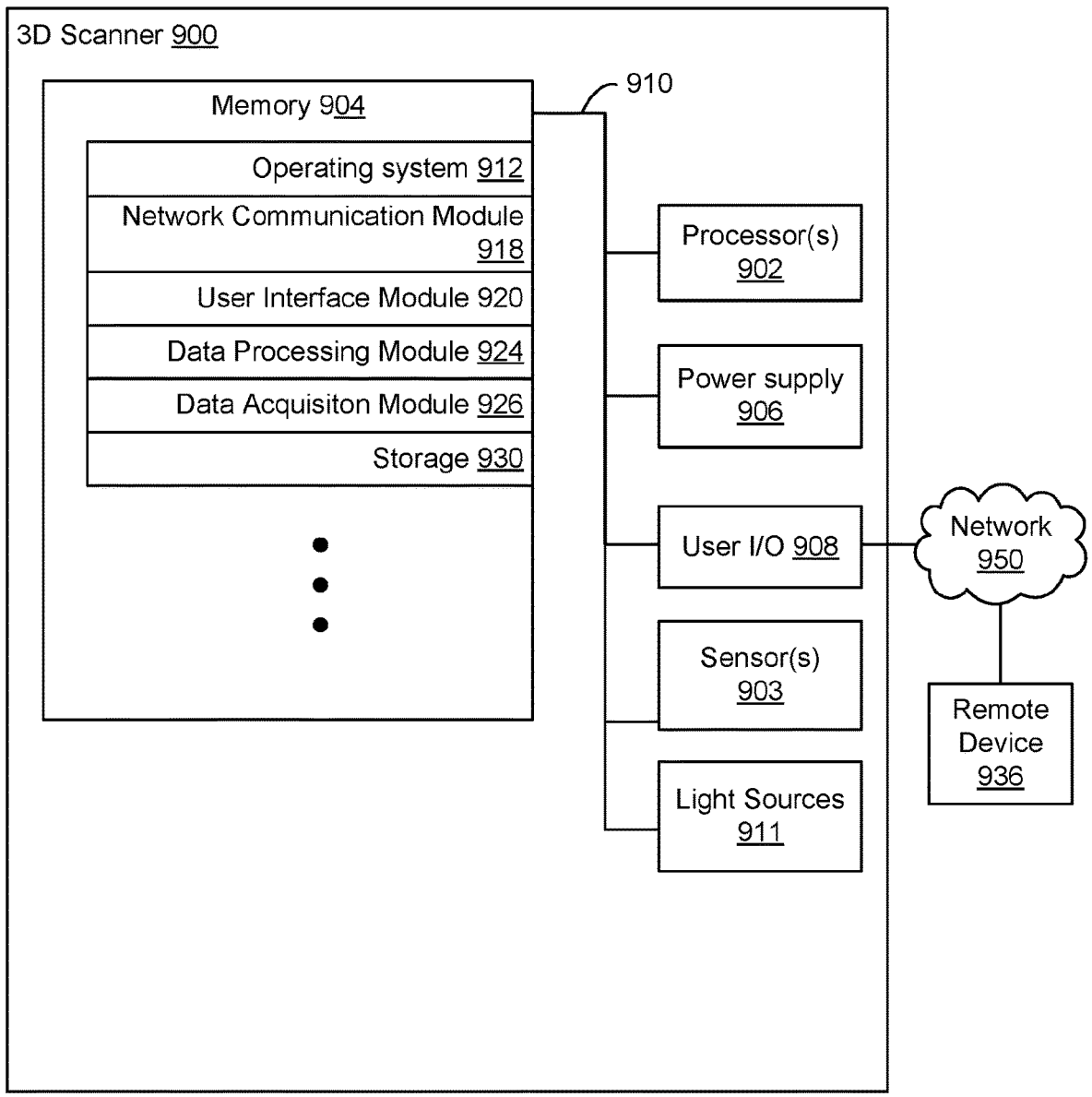
FIG. 9 is a block diagram of a 3D scanner, in accordance with some embodiments.

Each of the first camera 102, the second camera 106, and the third camera 110 records and transmits to a computer system (e.g., the computer system of 3D scanner 900 and/or remote device 936, FIG. 9) image data of the light emitted by projector 114 and reflected from the object to be measured.

Figure 4:
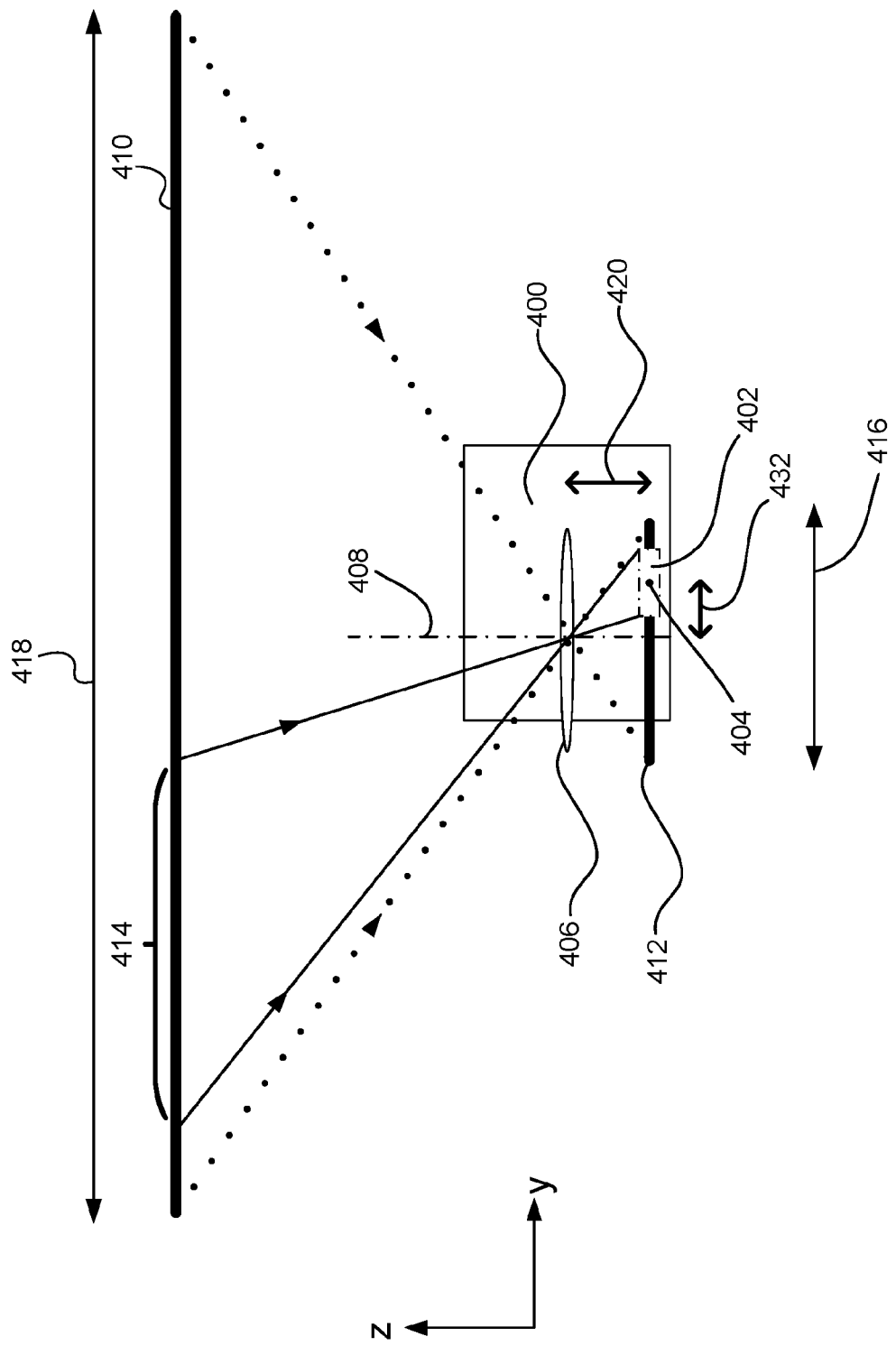
FIG. 4 is a schematic diagram of a camera having a sensor that is displaced with respect to an optical axis of the camera, in accordance with some embodiments.

A line 118 on the first sensor 104 denotes a displacement of a center of the first sensor 104 from a geometric center of the first camera 102 along both the x- and y-directions. In some embodiments, the geometric center of the first camera 102 is defined by an optical axis of its optics. A line 120 on the second sensor 108 denotes a displacement of a center of the second sensor 108 from a geometric center of the second camera 106, along both the x- and y-directions. Further details about the displacements of the centers of the sensors are depicted in FIG. 4. A center of the third sensor 112 of the third camera 110 is not displaced. According no lines denoting displacement are shown on the third sensor 112.

Each camera has a field of view, as described in further detail below. In some embodiments, the field of view of one of the cameras is different from the field of view of the other cameras. For example, in some embodiments, the field of view of the object from third camera 110 is smaller than the field of view of the object from first camera 102. In some embodiments, the field of view of the object from third camera 110 is larger than the field of view of the object from first camera 102. In various embodiments, each of the fields of views of the cameras may be the same or different.

The projector 114 includes a slide 116, and a line 122 denotes a displacement of a center of the slide 116 along the x-direction from a geometric center of the projector 114. In some embodiments, the geometric center of projector 114 is defined by the optical axis of the projector 114, as described in subsequent figures. Note that, in some embodiments, the displacement of the center of the slide 116 is optional (that is, in some embodiments, the slide is centered with respect to the projector).

In some embodiments, the projector 114, the first camera 102, the second camera 106, and the third camera 110 are all disposed on the same plane (e.g., within the x-y plane, at a particular value of z). In some embodiments, one or more of the projector 114, the first camera 102, the second camera 106, and the third camera 110 are located at different z values (e.g., one or more cameras and/or the projector extend above or below the plane of FIG. 1).

Figure 2:
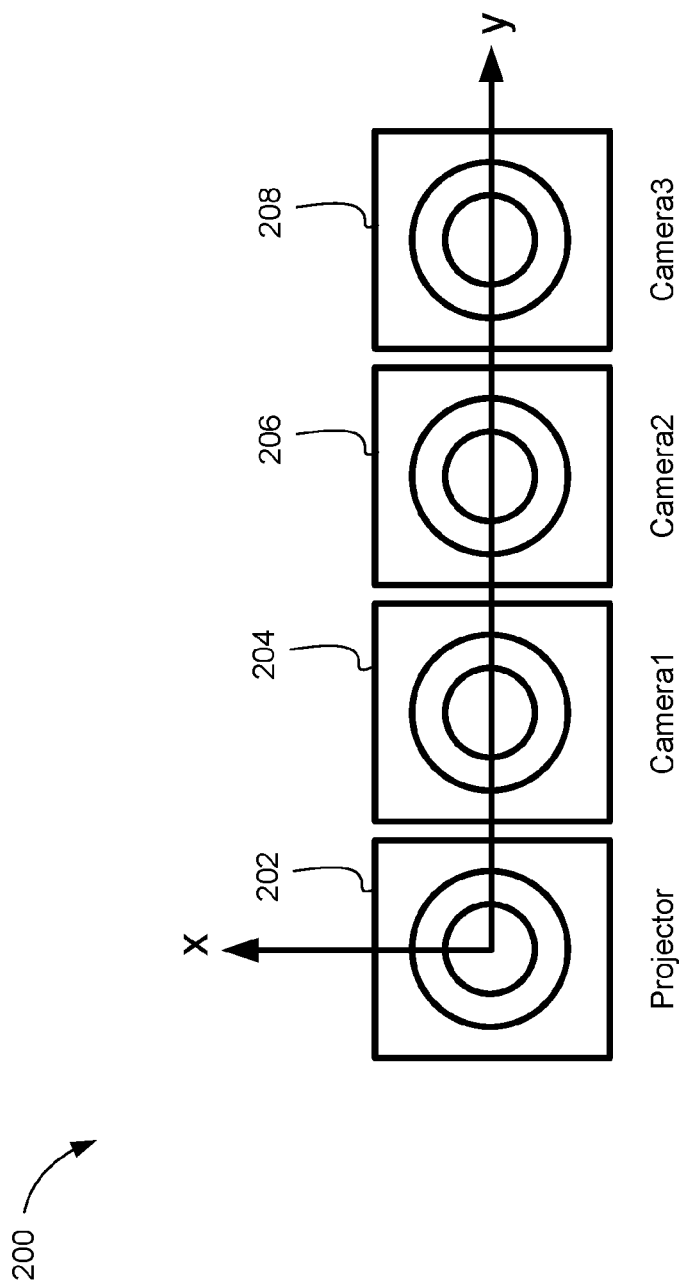
FIG. 2 is a schematic diagram of a side view of a 3D scanner, in accordance with some embodiments.

FIG. 2 shows a 3D scanner 200 in which a projector 202, and three cameras (a first camera 204, a second camera 206, and a third camera 208) are arranged in a substantially straight line along the y-direction. For example, there is substantially no variation along the x-direction in positions of the projector, the first camera 204, the second camera 206, and the third camera 208. In some embodiments the three cameras are arranged on one side of the projector 202. For ease of representation, a displacement (if present) of a center of the slide from an optical axis of the projector 202, and displacements (if present) of the centers of one or more of the sensors of the first camera 204, the second camera 206, and the third camera 208 from their respective optical axes, are not shown in FIG. 2.

Figure 3:
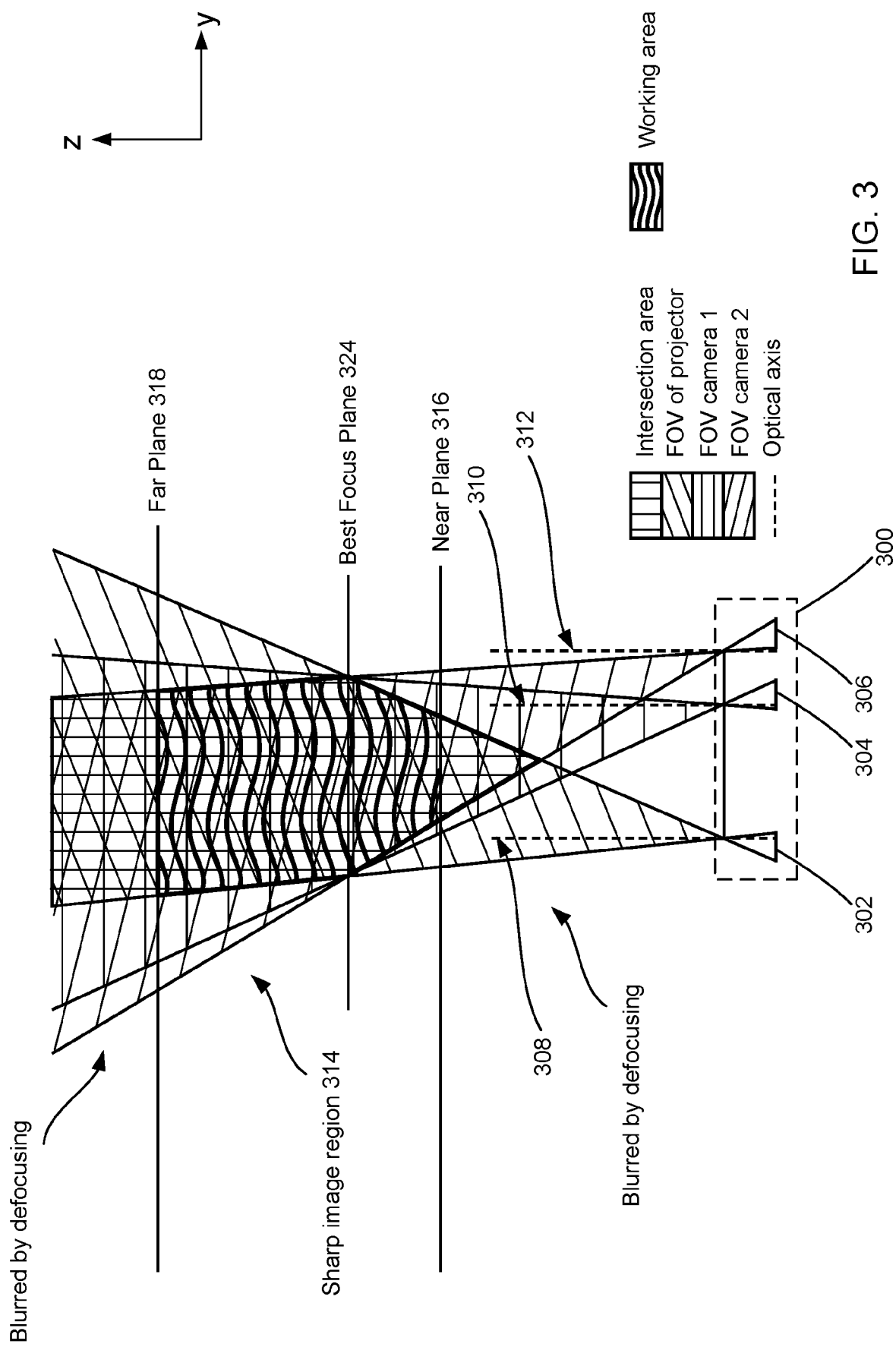
FIG. 3 is a schematic diagram of cameras having overlapping fields of view, in accordance with some embodiments.

FIG. 3 shows a view of a 3D scanner 300 along the z-y plane. The 3D scanner 300 includes a projector 302, a first camera 304 and a second camera 306. The projector 302 has an optical axis 308, the first camera 304 has an optical axis 310, and the second camera 306 has an optical axis 312.

In some embodiments, the optical axis 308 of the projector 302 is defined by optics (e.g., a lens system) in the projector 302. In some embodiments, the optical axis 310 of the first camera 304, and the optical axis 312 of the second camera 306 are defined by imaging optics (e.g., an imaging lens or lens system) in the first camera 304 and the second camera 306, respectively. In some embodiments, the optical axis passes through a center of curvature of each surface of the optical elements in the imaging optics, and coincides with an axis of rotational symmetry of the imaging optics.

Imaging optics in the first camera 304 and the second camera 306 form sharp images (on the respective sensors of the first camera 304 and the second camera 306) of objects located within a region 314. The region 314 is bounded by a near plane 316 and a far plane 318.

Images of objects located at distances along the z-direction that are closer to the near plane 316, or farther than the far plane 318 from the projector 302 and the first camera 304 and the second camera 306 are blurred by defocusing. Stated another way, in some embodiments, the near plane 316 and the far plane 318 are defined by a threshold resolution. In some embodiments, the threshold resolution is a resolution needed to detect and/or distinguish individual elements on the surface of the object. Outside of the region 314 defined by the near plane 316 and the far plane 318, defocusing results in an inability to resolve objects with the threshold resolution. A best focus plane 324 is located within the region 314. In some embodiments, surfaces positioned at a z-distance coinciding close to the best focus plane 324 form the sharpest images on the sensors of the first camera 304 and the second camera 306.

A field of view of a particular camera is the area or region of the object space that is captured on that camera's sensor. In some embodiments, the region 314 also represents a portion of the field of view of each of the first camera 304 and the second camera 306. The projector 302 also projects a non-coded pattern of light in the field of view of at least one of the first camera 304 and the second camera 306 (note that, in some embodiments, the fields of view of the first camera 304 and the second camera 306 overlap, and the projector projects the non-coded pattern of light where the fields of view overlap).

Figure 7:
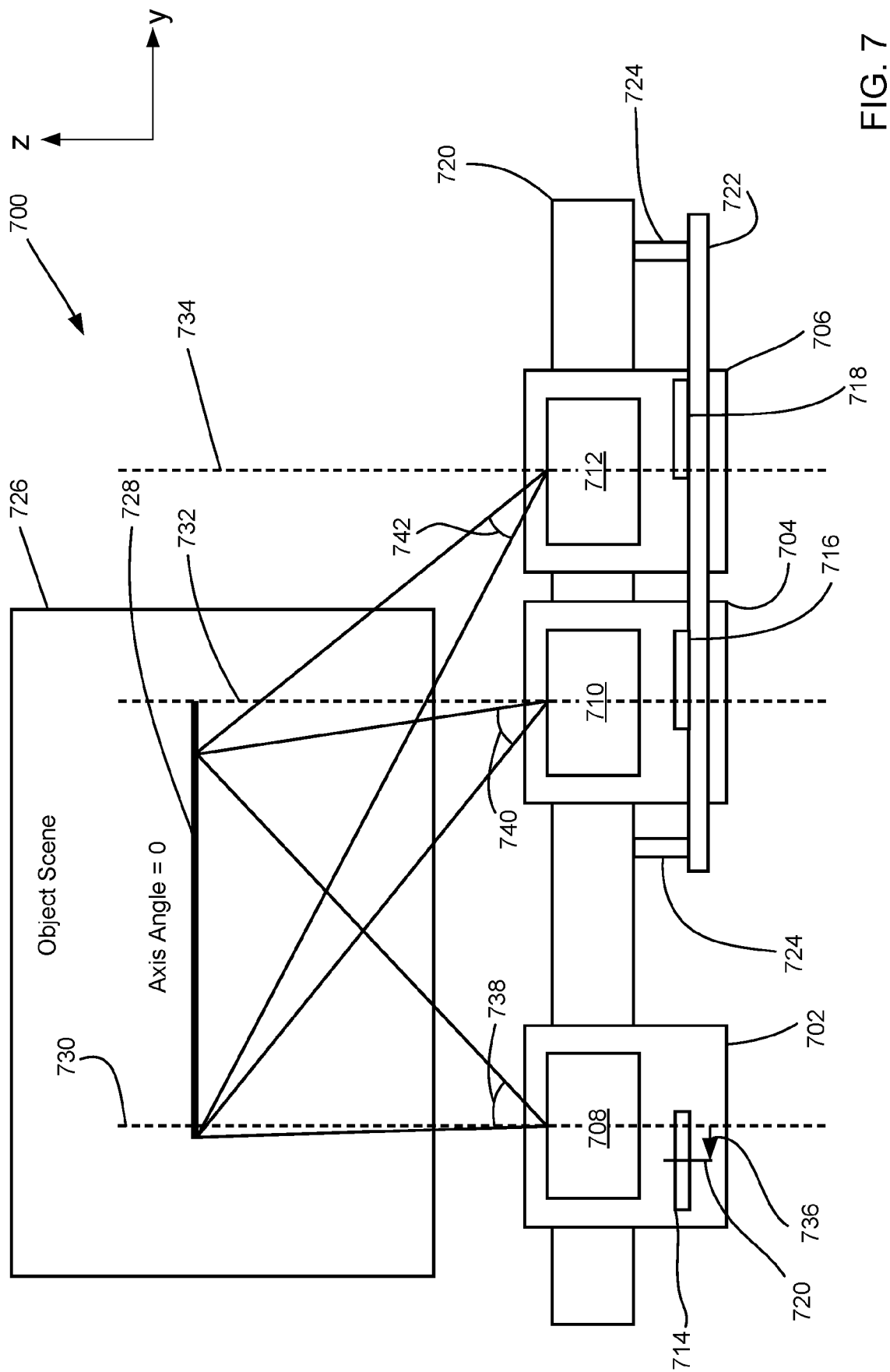
FIG. 7 is a schematic diagram of a side view of a 3D scanner, in accordance with some embodiments.
Figure 8:
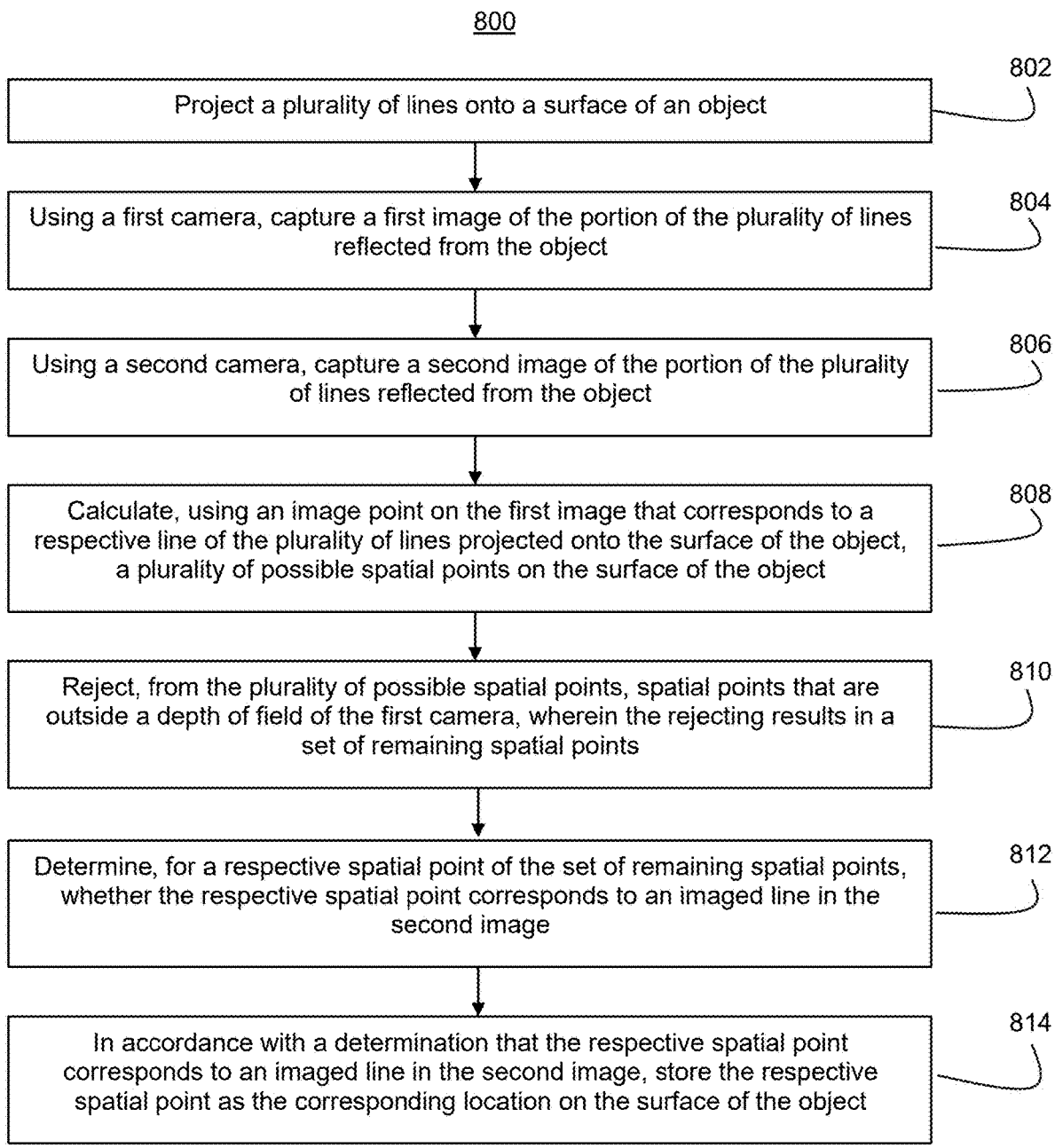
FIG. 8 illustrates a flow diagram of a method of generating a 3D model of an object, in accordance with some embodiments.

Mechanically arranging the projector 302, the first camera 304, and the second camera 306 such that their fields of view overlap enhances the performance of the 3D scanner 300 because, when a projected element of the pattern lays within the fields of view of each of the cameras (e.g., first camera 304, second camera 306), images obtained by the different cameras may be used to identify the projected elements (e.g., identify the correspondence with the projected pattern) as described with reference to method 800, FIG. 8. In some embodiments, in order to improve ease of manufacturing, among other benefits, the two or more cameras and the projector have optical axes that are substantially parallel, as shown in FIG. 3. This way, the two or more cameras (including their sensors and optics) can be mounted on parallel planes (as shown in FIG. 7). For example, the sensors for the two or more cameras may be mounted on a single printed circuit board. To maximize the overlaps of the fields of view of the two or more cameras, at least one camera's sensor is displaced with respect to its optical axis.

To that end, the optical axis 308 of the projector 302, the optical axis 310 of the first camera 304, and the optical axis 312 of the second camera 306 are substantially parallel to one another. In other words, an angle formed between any pair of optical axes 308, 310, 312 is close to zero (e.g., within design tolerances). To maximize an overlap of the field of view of the first camera 304, the field of view of the second camera 306, and the field of view of the projector 302, a geometric center of a sensor of each of the first camera 304 and the second camera 306 are displaced from the optical axis of the respective camera. In some embodiments, the geometric center of the sensor is a centroid of the sensor. In some embodiments, the geometric center of the sensor is a center pixel of the sensor.

In some embodiments, a geometric center of a slide in the projector 302 is also displaced from the optical axis of the projector so that a field of view of the projector 302 overlaps with the fields of view of the first camera 304 and the second camera 306. As used herein, the term field of view of the projector (or, equivalently, field of projection) is used to mean the region over which a slide pattern is projected. In some embodiments, the projector 302 includes a light source such as a lamp, an LED, or a laser, and the optical system includes a condenser lens. The condenser lens renders a divergent beam from the light source (e.g., a point source) into a substantially parallel beam to illuminate an object, such as the slide in the projector. In some embodiments, the slide defines a plurality of geometric elements. In various embodiments, the geometric elements comprise dots and/or horizontal (or vertical) parallel lines or bands. In some embodiments, the optical system of the projector includes additional optics (e.g., a lens) after the slide.

In other words, each point in a measurement area is imaged in each camera of the 3D scanner 300. Often, it is desirable to increase the measurement area of the object (e.g., the area of the object for which usable data are obtained in each image, for the purposes of generating a 3D reconstruction of the object). Increasing the overlap of the fields of view of the cameras (e.g., camera 304 and camera 306) increases the measurement area of the object. When the fields of view fully overlap (e.g., at the best focus plane 324), each of the cameras in the 3D scanner 300 receives reflected light from the same measurement area. In some embodiments, when three cameras are included in the 3D scanner, the measured object simultaneously has corresponding imaging points on all three cameras. In some embodiments, when four cameras are included in the 3D scanner, the measured object simultaneously has corresponding imaging points on all four cameras.

FIG. 4 illustrates how a center of a sensor is displaced (e.g., shifted) with respect to a geometric center of the camera (e.g., any of the cameras shown in the preceding or subsequent drawings, such as camera 102 or 106 in FIG. 1), in accordance with some embodiments. A camera 400 includes a sensor 402 (shown by a rectangle having a dot-dash outline) having a center 404. In some embodiments, center 404 of the sensor 402 is a pixel in a center of an array of pixels of the sensor 402. In some embodiments, center 404 is a centroid of the sensor 402. The camera 400 also includes imaging optics 406 (e.g., one or more lenses) that images one or more objects in a field of view 410 onto the sensor 402. The imaging optics 406 define an optical axis 408. In some embodiments, the optical axis 408 of the imaging optics 406 is an axis of symmetry (e.g., rotational symmetry) that passes through a center of curvature of the lens (or other optical elements) in the imaging optics 406. As an illustration, the imaging optics 406 are represented by a single lens. In some embodiments, the imaging optics 406 are an imaging system that includes one or more lenses and/or mirrors.

In some embodiments, the imaging optics 406 captures a larger field of view 410 (having a width 418 along the y-direction) than the sensor 402 can detect. For example, the imaging optics 406 forms an image 412 of the field of view 410. In FIG. 4, two edge rays (shown with dotted lines) of the field of view 410 are schematically shown to pass through a center of the imaging optics 406. For example, beyond the edge rays, aberrations such as vignetting become too severe to collect suitable data. The image 412 has a lateral dimension 416 (along the y-direction, as shown) that is larger than a width of the sensor 402.

By displacing a center 404 of the sensor 402, for example, along the y-direction, as shown in FIG. 4, a detected field of view 414 of the camera 400, as measured by the sensor 402, changes. The detected field of view 414 is also schematically shown by two edge rays (shown with solid lines) that pass through the center of the imaging optics 406 and reach the boundaries of the sensor 402. As a result of the displacement 432, the detected field of view 414 is asymmetric with respect to the optical axis 408 of the camera 400.

A field of view of the sensor 402 (e.g., an angle of coverage of sensor 402) depends on a displacement 432 along the y-direction of the center 404 of the sensor 402. The field of view also depends on a distance 420 along the z-direction between the imaging optics 406 and the sensor 402. The distance 420 is a parameter of the device design, and is known. A dimension (e.g., along the y-direction, along the x-direction) of the sensor 402 is also known.

FIG. 4 shows the camera 400 and its field of view 414 in the z-y plane. When the imaging optics 406 includes spherical optics (e.g., spherical lenses, spherical mirrors), the field of view 410 of the imaging optics 406 extends in the x-y plane and also has a width 418 along the x-direction.

In some embodiments, in addition to displacing the center 404 of the sensor 402 along the y-direction, the center 404 is also displaced along the x-direction (e.g., for embodiments in which the camera 400 is offset from the projector in the x-direction). For a sensor having a center that is displaced along both the x-direction and the y-direction, a field of view of the image is asymmetric about the optical axis 408 along both the y-direction (as shown in FIG. 4) and along the x-direction. In some embodiments, the center 404 of the sensor 402 is displaced only along the x-direction but not the y-direction. For a sensor having a center that is displaced only along the x-direction but not the y-direction, a field of view of the image is symmetric about the y-direction but asymmetric along the x-direction.

Figure 5:
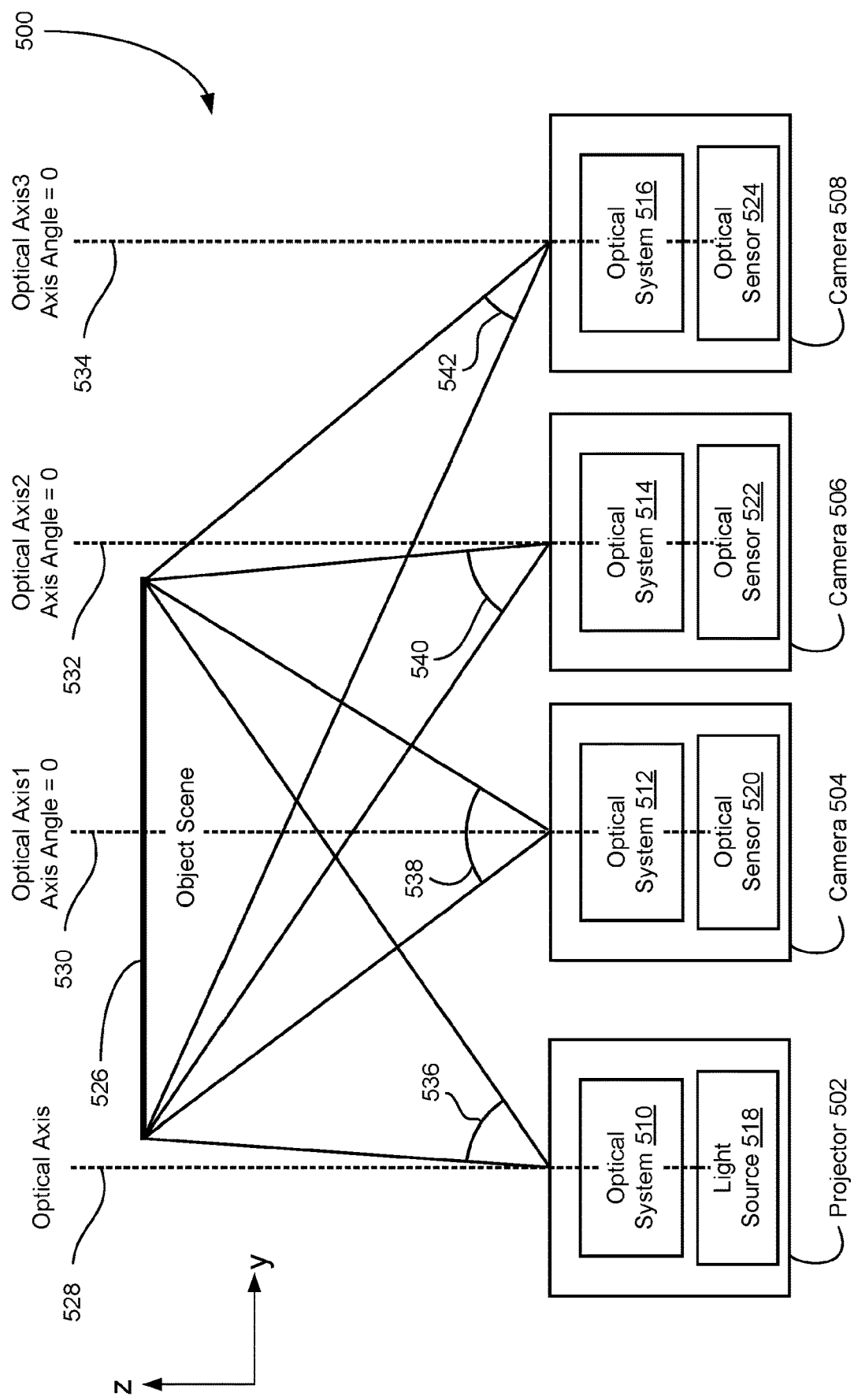
FIG. 5 is a schematic diagram of a side view of a 3D scanner, in accordance with some embodiments.

FIG. 5 shows a 3D scanner 500 that includes a projector 502, a first camera 504, a second camera 506, and a third camera 508. The projector 502 includes an optical system 510 configured to direct light from a light source 518 onto an object scene 526. In some embodiments, the light is projected through a patterned slide such that the light includes non-coded elements. In some embodiments, non-coded patterns of light include dashed lines, curved lines, or arrays of dots having predefined or calibrated positions on the projected pattern. In some embodiments, a common property of the non-coded pattern is that the pattern has a set of simple elements (e.g., lines, dots, small bars) having a relatively small dimension in at least a first direction. Individual features of these simple elements are not salient enough to identify the element by an image acquired from a single camera that is not sufficiently close to the projector. Instead, in some embodiments, each non-code element projected by the projector and reflected by the measurement object is identified (e.g., its correspondence with the projected slide pattern is identified) by comparing the coordinates of the lines perceived by the each of the cameras. In some embodiments, a larger offset of cameras from one another and the projector may lead to better accuracy in identifying the correspondence between the imaged elements and the projection pattern (e.g., using the method described with respect to FIG. 8).

The optical system 510 has an associated optical axis 528. The first camera includes an optical system 512, and an optical sensor 520. The optical system 512 has an associated optical axis 530. The second camera includes an optical system 514, and an optical sensor 522. The optical system 514 has an associated optical axis 532. The third camera includes an optical system 516, and an optical sensor 524. The optical system 516 has an associated optical axis 534. The optical axis 528 is substantially parallel to the optical axis 530, the optical axis 532, and the optical axis 534.

FIG. 5 shows the projector 502, the first camera 504, the second camera 506, and the third camera 508 arranged on a substantially straight line along the y-direction. A field of view 538 of the first camera 504 is substantially symmetrical about the optical axis 530 because a center of the optical sensor 520 is not displaced with respect to a geometric center of the first camera 504. A center of the optical sensor 522 is displaced along the y-direction to the right of FIG. 5, resulting in a field of view 540 of the second camera 506 that is asymmetric in the y-direction about the optical axis 532. A center of the optical sensor 524 is displaced even farther along the y-direction to the right of FIG. 5, resulting in a field of view 542 of the third camera 508 that is asymmetric in the y-direction about the optical axis 534. A slide (not shown) in the light source 518 is displaced along the y-direction to the left of FIG. 5 to produce a field of view 536 of the projector 502 that is asymmetric with respect to the optical axis 528. By appropriately displacing the sensors and the projector 502, the field of view 536 of the projector 502, the field of view 538 of the first camera 504, the field of view 540 of the second camera 506, and the field of view 542 of the third camera 508 substantially overlap at the object scene 526.

In some embodiments, the 3D scanner 500 includes one or more processors (e.g., processors 902, FIG. 9) configured to receive data recorded by the optical sensors. In some embodiments, the data generated by the optical sensors is quite large. For example, some optical sensors provide more than 100 frames-per-second (fps), and, for accuracy reasons, it is often desirable to use as high of a frame rate as possible (e.g., processing more frames provides a sharper 3D model with better accuracy for the same scanning time). As an example, three ultra-high-definition (HD) cameras may produce a throughput of 30 gigabits per second. In some embodiments, to solve this problem, the one or more processors that are configured to receive data recorded by the optical sensors are field programmable gate arrays (FPGAs), which are capable of enormous data processing parallelism. However, a disadvantage of FPGAs is that they typically include a small amount of onboard random access memory (RAM).

In some embodiments, to solve this problem, the optical sensors are configured to sequentially provide data along a readout direction that is parallel to a direction in which the sensor is displaced (e.g., the y-direction). In some embodiments, the 3D scanner 500 includes an FPGA, onto which the data is readout from each optical sensor (e.g., the data from each sensor is readout onto a single common FPGA, so as to avoid the need for inter-chip communications). At any given time during readout, the FPGA stores, for each optical sensor, a portion of an image of the object scene that includes a same subset, less than all, of the elements projected onto the surface of the object (e.g., the same subset is concurrently stored in the RAM of each FPGA). In some embodiments, method 800, described below, is performed for each respective element (e.g., by calculating a spatial point on the surface of the object corresponding to that element) while an image of the respective element is stored from each optical sensor in the RAM of the FPGA. In this manner, method 800 is performed as readout occurs.

Figure 6:
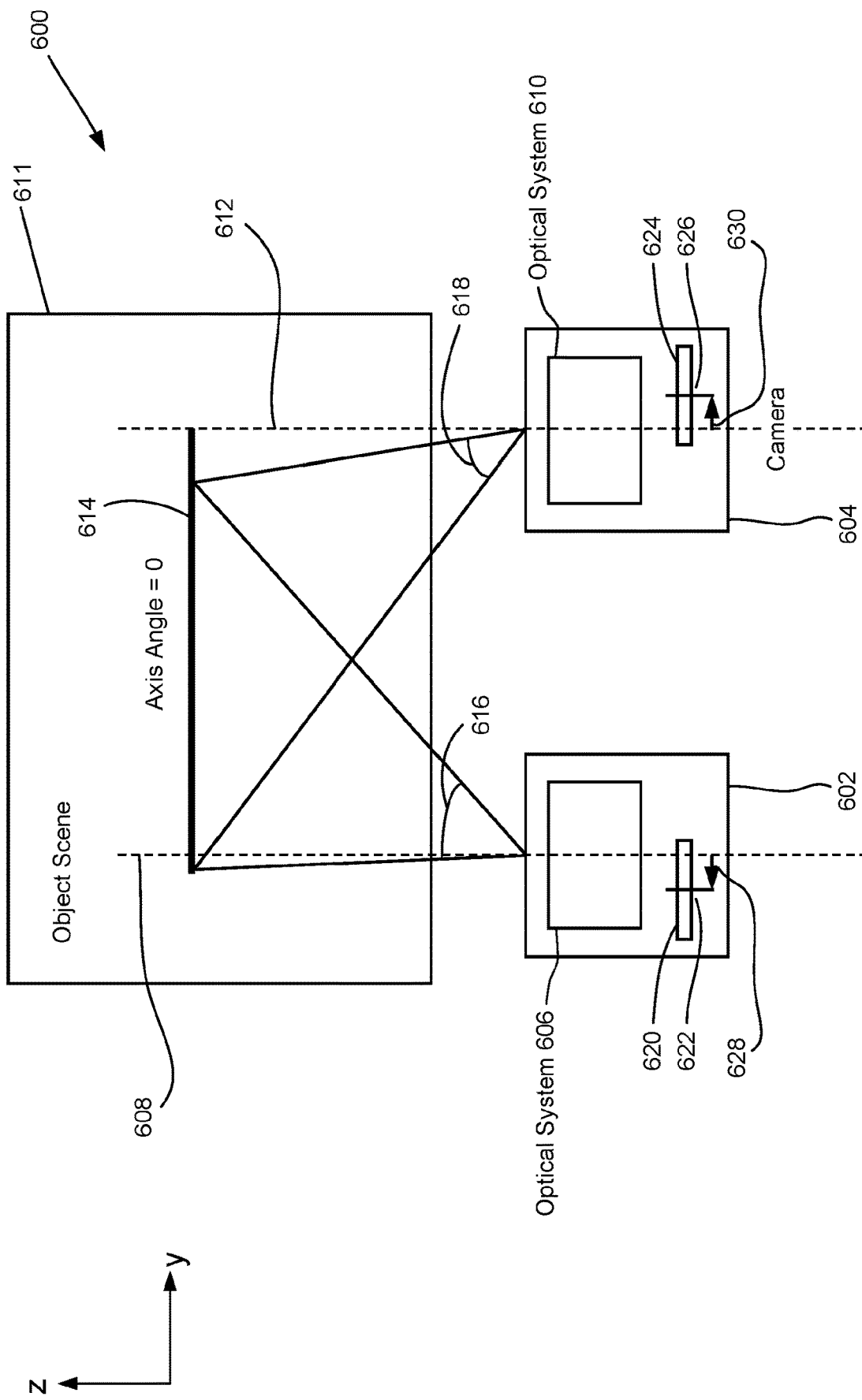
FIG. 6 is a schematic diagram of a side view of a 3D scanner, in accordance with some embodiments.

FIG. 6 shows a 3D scanner 600 that includes a projector 602 and a single camera 604. The projector 602 includes an optical system 606 having an associated optical axis 608. The projector 602 also includes a slide 620. A center 622 of the slide 620 is displaced by a distance 628 relative to the optical axis 608, along the y-direction, to the left of FIG. 6. The displacement in the center 622 of the slide 620 results in a field of view 616 of the projector 602 that is asymmetric with respect to the optical axis 608.

The single camera 604 includes an optical system 610 having an associated optical axis 612. The single camera 604 also includes a sensor 624. A center 626 of the sensor 625 is displaced by a distance 630 relative to the optical axis 612, along the y-direction, to the right of FIG. 6. The displacement of the center 626 of the sensor 624 results in a field of view 618 of the single camera 604 that is asymmetric with respect to the optical axis 612. The field of view 616 of the projector 602 and the field of view 618 of the single camera 604 overlap at a plane 614 in an object scene 611. The plane 614 is indicated by a line in the z-y plane. The plane 614 extends in the x-y plane. The optical axis 608 of the projector 602 is substantially parallel to the optical axis 612 of the single camera 604. In other words, an angle formed by the optical axis 608 and the optical axis 612 is close to zero.

FIG. 7 shows a 3D scanner 700 that includes a projector 702, a first camera 704, and a second camera 706. The projector 702 includes an optical system 708 having an associated optical axis 730. The projector 702 also includes a slide 714. A center of the slide 714 is displaced by a distance 736 relative to the optical axis 730, along the y-direction, to the left of FIG. 7. The displacement in the center of the slide 714 results in a field of view 738 of the projector 702 that is asymmetric with respect to the optical axis 730.

The first camera 704 includes an optical system 710 having an associated optical axis 732. The first camera 704 also includes a sensor 716 having a center that is displaced relative to the optical axis 732, along the y-direction, to the right of FIG. 7. The displacement of the sensor 716 results in a field of view 740 of the first camera 704 that is asymmetric with respect to the optical axis 732.

The second camera 706 includes an optical system 712 having an associated optical axis 734. The second camera 706 also includes a sensor 718 having a center that is displaced relative to the optical axis 734, along the y-direction, to the right of FIG. 7. The displacement of the sensor 718 results in a field of view 742 of the second camera 706 that is asymmetric with respect to the optical axis 734.

In some embodiments, the projector 702, the first camera 704 and the second camera 706 are connected to an optical holder 720. In some embodiments, the projector 702, the first camera 704 and the second camera 706 are mounted on the optical holder 720. In some embodiments, the optical holder 720 is configured to mechanically couple the projector 702, the first camera 704 and the second camera 706. In some embodiments, the sensor 716 of the first camera 704 and the sensor 718 of the second camera 706 are supported on a common mechanical support 722. In some embodiments, the sensor 716 of the first camera 704 and the sensor 718 of the second camera 706 are fabricated (e.g., directly) on mechanical support 722 (i.e., mechanical support 722 is an integral structure). In some embodiments, the mechanical support 722 includes a printed circuit board (PCB). In some embodiments, mechanical support 722 is flat. In some embodiments, sensor 716 and sensor 718 are thus positioned in a common plane. In some embodiments, connection elements 724 couple the mechanical support 722 to the optical holder 720. For example, a single mechanical support for the optics of the different cameras mechanically couples the projector 702, the first camera 704 and the second camera 706).

The field of view 738 of the projector 702, the field of view 740 of the first camera 704, and the field of view 742 of the second camera 706 overlap at a plane 728 in an object scene 726. The plane 728 is indicated by a line in the z-y plane. The plane 718 extends in the x-y plane. The optical axis 730 of the projector 702 is parallel to the optical axis 732 of the first camera 704 and the optical axis 734 of the second camera 706.

Mounting the sensors of different cameras on the same mechanical support (and/or fabricating the sensors directly on the mechanical support) simplifies manufacturing of the sensors and provides for faster temperature stabilization between the first camera 704 and the second camera 706. For example, having a single mechanical support quickly stabilizes the temperature between the sensor 716 and the sensor 718. When the sensors are mounted on the same mechanical support, there is less misalignment error associated with offsets of the camera along the z-direction. In some embodiments, the optical holder 720 fastens and secures the optical system 708, the optical system 710, and the optical system 712 to the same substrate. Securing the optical system 708 to the same substrate reduces misalignment in the z-direction and the x-direction between the different optical systems and allows their relative desired offsets in the y-direction to be more accurately maintained.

Monochrome sensors are commonly used in 3D scanners for capturing a pattern of light created by a light source of a projector and reflected by a measurement object. Monochrome sensors do not include color filters. 3D scanners often have a separate color sensor for capturing texture information of an object. In some embodiments, the texture information includes color information as well as, optionally, one or more non-color properties of the appearance of the object (e.g., specularness). For example, a color optical sensor includes one or more built-in filters that detect both color and brightness of incoming light. In some embodiments, these two functionalities (e.g., texture sensing and mapping 3D contours of an object) are combined in one color camera (e.g., first camera 504, having a color sensor configured to receive reflected light of different wavelengths from the object). One frame from the color camera captures an image of a projected light pattern reflected from a measurement object and a subsequent frame captures color or texture information of the object. In some embodiments, color optical sensors have lower sensitivity due to the presence of the color filter. In some embodiments, the remaining cameras (e.g., cameras 506 and 508) are monochrome cameras.

FIG. 8 illustrates a flow diagram of a method 800 of generating a 3D model of an object, in accordance with some embodiments. In some embodiments, method 800 is performed at a 3D scanner (e.g., any of the 3D scanners described with reference to the preceding figures). In some embodiments, certain operations of method 800 are performed by a computer system distinct from the 3D scanner (e.g., a computer system that receives data from the 3D scanner and processes the data, such as remote device 936, FIG. 9). Some operations in method 800 are, optionally, combined and/or the order of some operations is, optionally, changed. For ease of explanation, method 800 is described as being performed by 3D scanner 700 (FIG. 7).

Method 800 includes projecting (802) a plurality of elements onto a surface of an object (e.g., using projector 702). In some embodiments, the elements are non-coded elements. In some embodiments, the elements are lines.

Method 800 includes, using a first camera (e.g., first camera 704, FIG. 7), capturing (804) a first image of the portion of the plurality of lines reflected from the object. The portion of the plurality of lines that is captured in the first image are those within the field of view of the first camera.

Method 800 includes, using a second camera (e.g., second camera 706, FIG. 7), capturing (806) a second image of the portion of the plurality of lines reflected from the object. The portion of the plurality of lines that is captured in the second image are those within the field of view of the second camera.

In some embodiments, the first image and the second image are captured substantially simultaneously. In some embodiments, the first image and the second image are captured while the plurality of elements are projected onto the surface of the object.

In some embodiments, a respective one of the first camera and the second camera is a color (e.g., RGB) camera. In some embodiments, the other of the first camera and the second camera is a monochromatic camera. In some embodiments, the plurality of elements are projected (e.g., shone) onto the surface of the object stroboscopically. Images obtained while the plurality of elements are projected onto the surface of the object are used for 3D reconstruction of the surface of the object (as described below). In addition, in some embodiments, the color camera also obtains images while the plurality of elements is not projected onto the surface of the object. In some embodiments, the color camera obtains images between stroboscopic projections of the projector. Thus, in some embodiments, color images of the object do not include a reflection of the plurality of non-coded elements. In some embodiments, the images obtained while the plurality of elements is not projected onto the surface of the object are used to generate texture for the 3D reconstruction of the surface of the object.

Method 800 includes calculating (808), using an image point on the first image that corresponds to a respective line of the plurality of lines projected onto the surface of the object, a plurality of possible spatial points on the surface of the object. In some embodiments, calculating the plurality of possible spatial points includes calculating a z-component of the plurality of possible spatial points. In some embodiments, each possible spatial point on the surface of the object is calculated by hypothesizing a correspondence between the imaged element in the first image and the element in the projection pattern on the slide. Once the correspondence is known, determining the spatial point on the surface of the object can be accomplished by utilizing a triangulation algorithm, taking into account the 3D scanner's geometry. Triangulation, as used herein, is the use of a position, within an image, of a known element projected onto the surface of the object, together with knowledge of the scanner's geometry, to determine a position of a point on the surface of the object.

Some of the possible (e.g., hypothesized) spatial points may lie outside of the depth of field (e.g., depth of focus) of the 3D scanner 700 (e.g., lie outside of region 314, FIG. 3). Thus, method 800 includes rejecting, from the plurality of possible spatial points, spatial points that are outside a depth of field of the first camera, wherein the rejecting results in a set of remaining spatial points.

Method 800 includes, for a respective spatial point of the set of remaining spatial points, determining (812) whether the respective spatial point corresponds to an imaged line in the second image (e.g., by using the 3D scanner 700's geometry and the hypothesized spatial point on the surface of the object to map the point in the first image to the point in the second image).

Method 800 further includes, in accordance with a determination that the respective spatial point corresponds to an imaged line in the second image, storing (814) the respective spatial point as a corresponding location on the surface of the object. For example, the fact that a hypothesized spatial coordinate of the line in the first image maps to a line in the second image confirms that the hypothesis was correct. In some embodiments, additional images may be needed to eliminate the ambiguity in correspondence between elements in the first image and elements in the projection pattern. Thus, in some embodiments, additional cameras are used to acquire additional images (e.g., FIG. 5 shows a scanner with three cameras).

In some embodiments, method 800 includes, in accordance with a determination that the respective spatial point does not correspond to an imaged non-coded element in the third image, removing the respective spatial point from the memory as a possible corresponding location on the surface of the object. In some embodiments, method 800 includes eliminating the hypothesized correspondence between the imaged element and the element of the projection pattern from the set of possibilities.

It should be understood that the particular order in which the operations in FIG. 8 have been described is merely an example and is not intended to indicate that the described order is the only order in which the operations could be performed. One of ordinary skill in the art would recognize various ways to reorder the operations described herein.

FIG. 9 is a block diagram of 3D scanner 900, in accordance with some embodiments. Note that the 3D scanners described with reference to any of the preceding figures may include any of the features described with respect to 3D scanner 900. For example, any of the 3D scanners described with reference to preceding figures may include a computer system, as described with respect to 3D scanner 900. 3D scanner 900, or the computer system of 3D scanner 900, typically includes memory 904, one or more processor(s) 902, a power supply 906, user input/output (I/O) subsystem 908, one or more sensors 903 (e.g., cameras), one or more light sources 311 (e.g., projectors), and a communication bus 910 for interconnecting these components. The processor(s) 902 execute modules, programs, and/or instructions stored in memory 904 and thereby perform processing operations.

In some embodiments, the processor(s) 902 include at least one central processing unit. In some embodiments, the processor(s) 902 include at least one graphical processing unit. In some embodiments, the processor(s) 902 include at least one field programmable gate array.

In some embodiments, memory 904 stores one or more programs (e.g., sets of instructions) and/or data structures. In some embodiments, memory 904, or the non-transitory computer readable storage medium of memory 904 stores the following programs, modules, and data structures, or a subset or superset thereof:

an operating system 912 that includes procedures for handling various basic system services and for performing hardware-dependent tasks;

network communication module(s) 918 for connecting the 3D scanner to other computer systems (e.g., remote device 936) via one or more communications network(s) 950;

a user interface module 920 that receives commands and/or inputs from a user via user input/output (I/O) subsystem 908 and provides outputs for presentation and/or display on user input/output (I/O) subsystem 908;

data processing module 924 for processing or pre-processing data from sensors 903, including optionally performing any or all of the operations described with respect to method 800 (FIG. 8);

data acquisition module 926 for controlling the cameras, projectors, and readout of the sensors; and storage 930 including buffer(s), RAM, ROM, and/or other memory that stores data used and generated by 3D scanner 900.

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 904 stores a subset of the modules identified above. Furthermore, the memory 904 may store additional modules not described above. In some embodiments, the modules stored in the memory 904, or a non-transitory computer readable storage medium of the memory 904, provide instructions for implementing respective operations in the methods described below. In some embodiments, some or all of these modules may be implemented with specialized hardware circuits (e.g., FPGAs) that subsume part or all of the module functionality. One or more of the above identified elements may be executed by one or more of the processor(s) 902.

In some embodiments, the user input/output (I/O) subsystem 908 communicatively couples the 3D scanner 900 to one or more devices, such as one or more remote device(s) 936 (e.g., an external display) via a communications network 950 and/or via a wired and/or wireless connection. In some embodiments, the communications network 950 is the Internet. In some embodiments, the user input/output (I/O) subsystem 908 communicatively couples the 3D scanner 900 to one or more integrated or peripheral devices, such as a touch-sensitive display.

In some embodiments, sensors 903 include a first optical sensor (e.g., a CCD) that collects texture (e.g., color data) (e.g., sensor 716, FIG. 7), a second optical sensor (e.g., a CCD) that collects 3D data (e.g., sensor 718), and a motion sensor (e.g., a 9 degree-of-freedom (DOF) sensor, which may be implemented using microelectromechanical systems (MEMS), gyroscopes, and one or more Hall sensors). In some embodiments, the first optical sensor collects 3D data in addition to collecting texture.

In some embodiments, light sources 911 (e.g., components of the projectors described herein) include one or more lasers. In some embodiments, the one or more lasers comprise vertical-cavity surface-emitting lasers (VCSELs). In some embodiments, light sources 911 also include an array of light emitting diodes (LEDs) that produce visible light.

The communication bus 910 optionally includes circuitry (sometimes called a chipset) that interconnects and controls communications between system components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

It will also be understood that, although the terms first, second, etc. are, in some instances, used herein to describe various elements, these elements should not be limited by these terms. These terms are only used to distinguish one element from another. For example, a first sensor could be termed a second sensor, and, similarly, a second sensor could be termed a first sensor, without departing from the scope of the various described embodiments. The first sensor and the second sensor are both sensors, but they are not the same sensor, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

What is claimed is:

1. A system, comprising:
   a projector configured to project a plurality of non-coded elements onto an object, the projector having a first optical axis;
   a first camera comprising a first lens and a first sensor, wherein the first lens focusses a reflection of a first portion of the plurality of non-coded elements onto the first sensor, and wherein the first lens defines a second optical axis;
   a second camera comprising a second lens and a second sensor, wherein the second lens focusses a reflection of a second portion of the plurality of non-coded elements onto the second sensor, and wherein the second lens defines a third optical axis; and
   a mechanical support that mechanically couples the first camera to the second camera,
   wherein:
   the mechanical support comprises a printed circuit board on which the first sensor and the second sensor are disposed,
   the projector, the first camera, and the second camera are offset from one another in a first direction, the first optical axis is substantially parallel to the second optical axis, which is substantially parallel to the third optical axis,
a center of the first sensor is displaced along the first direction away from the second optical axis, and
a center of the second sensor is displaced along the first direction away from the third optical axis,
the projector comprises a slide that is displaced along the first direction, away from the first optical axis, and a field of view of the projector over which the plurality of non-coded elements is projected on the object is asymmetric with respect to the first optical axis.

2. The system of claim 1, wherein the projector, the first camera, and the second camera are disposed on a substantially straight line in the first direction.

3. The system of claim 2, wherein the projector is positioned at a first end of the substantially straight line, and wherein the first camera and the second camera are positioned along the first direction on the substantially straight line, on one side of the projector.

4. The system of claim 1, wherein a depth of field of the first camera is substantially identical to a depth of field of the second camera.

5. The system of claim 1, wherein the center of the second sensor, displaced along the first direction, provides a field of view of the object from the second camera that is asymmetric with respect to the third optical axis.

6. The system of claim 5, wherein a field of view of the projector over which the plurality of non-coded elements is projected onto the object, a field of view of the object from the first camera, and a field of view of the object from the second camera are configured to overlap.

7. The system of claim 6, wherein the field of view of the object from the first camera is larger than the field of view of the projector.

8. The system of claim 2, further comprising:
a third camera having a third lens and a third sensor, wherein:
the third lens focusses a reflection of a third portion of the plurality of non-coded elements onto the third sensor,
the third lens defines a fourth optical axis,
the projector is positioned at a first end of the substantially straight line,
the first camera, the second camera, and the third camera are positioned along the first direction on the substantially straight line, on one side of the projector,
the center of the second sensor, displaced along the first direction, provides a field of view of the object from the second camera that is asymmetric with respect to the third optical axis, and
a field of view of the projector over which the plurality of non-coded elements is projected onto the object, a field of view of the object from the first camera, and a field of view of the object from the second camera are configured to overlap.

9. The system of claim 8, wherein the field of view of the object from the third camera is smaller than the field of view of the object from the second camera.

10. The system of claim 1, further comprising an optical holder configured to mechanically couple the projector, the first camera, and the second camera.

11. The system of claim 1, wherein the first sensor comprises a color sensor configured to receive reflected light of different wavelengths from the object.

12. The system of claim 11, wherein the reflected light of different wavelengths from the object provides texture information of the object.

13. The system of claim 11, further comprising one or more processors configured to receive a first image from the first sensor, and a subsequent second image from the first sensor, wherein the first image comprises the reflection of the first portion of the plurality of non-coded elements, and the subsequent second image comprises a color image of the object that does not include a reflection of the plurality of non-coded elements.

14. The system of claim 1, further comprising one or more processors configured to receive data recorded by the first sensor and data recorded by the second sensor, wherein both the first sensor and the second sensor are configured to sequentially provide data to one or more processors along a readout direction.

15. The system of claim 14, wherein the readout direction of the first camera is parallel to the first direction.

16. The system of claim 15, wherein the one or more processors comprise a common processor that receives the data from both the first sensor and the second sensor.

17. The system of claim 16, wherein the common processor is a field programmable gate array.

18. The system of claim 1, further comprising one or more processors and memory storing instructions for:
calculating, using an image point on a first image from the first camera that corresponds to a respective non-coded element of the plurality of non-coded elements projected onto the surface of the object, a plurality of possible spatial points on the surface of the object;
rejecting, from the plurality of possible spatial points, spatial points that are outside a depth of field of the first camera, wherein the rejecting results in a set of remaining spatial points;
for a respective spatial point of the set of remaining spatial points, determining whether the respective spatial point corresponds to an imaged non-coded element in a second image from the second camera; and
in accordance with a determination that the respective spatial point corresponds to an imaged non-coded element in the second image, storing the respective spatial point as a corresponding location on the surface of the object.

19. The system of claim 18, wherein the memory further stores instructions for:
determining whether the respective spatial point corresponds to an imaged non-coded element in a third image from a third camera; and
in accordance with a determination that the respective spatial point corresponds to an imaged non-coded element in the third image, storing the respective spatial point as the corresponding location on the surface of the object.

20. The system of claim 19, wherein the instructions further include instructions for:
in accordance with a determination that the respective spatial point does not correspond to an imaged non-coded element in the third image, removing the respective spatial point from the memory as a possible corresponding location on the surface of the object.

21. The system of claim 18, wherein determining whether the respective spatial point corresponds to an imaged non-coded element in the second image comprises calculating an image point in the second image that corresponds to the respective spatial point and identifying whether a portion of a non-coded element is imaged at the image point.

22. The system of claim 1, wherein the non-coded elements are lines.

\* \* \* \* \*